United States Patent [19]

Beson

[11] Patent Number: 4,566,671
[45] Date of Patent: Jan. 28, 1986

[54] GATE VALVE HAVING A SECONDARY SEAL

[76] Inventor: John Beson, 1330 Sherwood Forest, #205, Houston, Tex. 77043

[21] Appl. No.: 551,589

[22] Filed: Nov. 14, 1983

[51] Int. Cl.$^4$ .............................................. F16K 25/00
[52] U.S. Cl. .................................. 251/159; 251/167; 251/174; 251/203
[58] Field of Search ............... 251/158, 159, 174, 194, 251/197, 203, 167, 168

[56] References Cited

U.S. PATENT DOCUMENTS

| | | | |
|---|---|---|---|
| 1,692,496 | 11/1928 | Frob | 251/194 X |
| 2,134,277 | 10/1938 | Sproull | 251/191 |
| 2,203,989 | 6/1940 | Hamer | 251/159 |
| 2,471,941 | 5/1949 | Downey | 251/174 X |
| 2,776,813 | 1/1957 | Blackman | 251/197 |
| 2,800,926 | 7/1952 | Handley | 251/203 X |
| 3,033,237 | 5/1962 | Belford | 251/167 X |
| 3,472,270 | 10/1969 | Masheder | 251/174 X |
| 3,557,822 | 1/1971 | Chronister | 251/203 x |
| 4,290,580 | 9/1981 | Balhouse | 251/197 X |

Primary Examiner—Harold W. Weakley
Attorney, Agent, or Firm—David M. Ostfeld

[57] ABSTRACT

A gate valve is disclosed having a secondary seal, wherein the gate forms a metal to metal seal with the seat and wherein a resilient seal is moved toward the gate in a closed position to form a secondary fluid-tight seal with the gate. A device for deenergizing the secondary seal is provided in order to prevent wear of the secondary seal upon opening of the gate and also to reduce the gate drag caused by the energized secondary seal. Also disclosed is a pressure relief mechanism for the secondary seal adapted to prevent damage to the seal and a mechanism for evenly applying opposing secondary seals.

15 Claims, 7 Drawing Figures

GATE VALVE HAVING A SECONDARY SEAL

BACKGROUND OF THE INVENTION

The present invention relates to gate valves and, more specifically, it relates to improvements to a gate valve having a secondary seal.

As discussed in U.S. Pat. No. 4,377,273, one problem frequently encountered in the case of gate valves is the lack of formation of adequate seals between the gate or gates and the seat or seats. In turn, if a seal is inadequate, the gate valves are often prone to leak through the seal. In U.S. Pat. No. 4,377,273, an invention is disclosed which seeks to provide an adequate seal for gate valves in the form of a positive bidirectional cam actuated and deactuated resilient secondary fluid seal.

While the invention described in U.S. Pat. No. 4,377,273 is believed to be advantageous for many applications, it has been found that there are applications in which other secondary seals may be provided. In particular, in high pressure situations wherein the formation of the secondary seal causes a significant pressure differential on the two sides of the gate and wherein the secondary seal is located on the downstream side, it has been found that for some applications, the drag on the secondary seal caused by movement of the gate to open when the secondary seal is fully effected may exaggerate the wear of the secondary seal. The additional drag on the gate also increases the effort required to open the valve. It is desirable in those instances to be able to deenergize or release the secondary seal prior to substantial linear movement of the gate across the seal.

In this regard, it is not necessary to totally withdraw the seal from the gate, but rather it is desirable to relieve the full pressure of the seal against the gate, or "deenergize" the seal, such that the pressure of the fluid moving through the valve will flow between the seal and the gate to preclude wear.

Additionally, in some high pressure situations wherein the secondary seal is fully effected or energized with no pressure in the valve body, and pressure is thereafter applied from the upstream side, there is no way for the fluid to enter into the body without leaking past the energized upstream secondary seal. Since the upstream secondary seal is mechanically energized, it is maintained until the pressure load of the fluid overcomes the mechanical load. In some instances, the pressure of the fluid is great enough to blow past the seal once it overcomes the mechanical energy of the seal, thereby damaging the resilient sealing ring contained in the seal.

It is therefore desirable to provide a pressure relief means for a secondary seal subjected to such pressurized fluid under the above conditions, in which the fluid will force the seal away from the gate and allow movement of the fluid past the seal without damaging the resilient seal element when the pressure of the fluid reaches a selected value.

SUMMARY OF THE INVENTION

The present invention provides the desired improvement for providing pressure relief through the inclusion of a spring member between a resilient secondary seal and the seal supporting ring. The spring member has a selected spring constant chosen such that the spring will yield to allow fluid past the secondary seal when the pressure is sufficient to exert a selected force upon the seal ring.

The means for deenergizing the secondary seal prior to substantial linear movement of the gate may be effected in two ways. First, the seal may be quickly deenergized through the provision of a elastomeric seal ring disposed between the seal support ring and the resilient seal member such that movement of the seal support ring causes immediate lessening of the pressure on the secondary seal and the loss of the seal on the secondary seal because of the expansion and elasticity provided by the compressed elastomeric seal member. Alternatively, the seal may be deenergized through means of a floating wedge slidably mounted to the gate such that the wedge is adapted for movement to release the seal prior to movement of the gate. Each of these designs, therefore, effectively takes pressure off the resilient seal member of the secondary seal before substantial movement, or in the case of the wedge, before any movement of the gate across the secondary seal.

More specifically, the present invention includes a gate valve comprising a valve body having a valve chamber therewithin and a pair of flow passages through the valve body aligned at opposite sides of the valve chamber. The valve body further has a recess around the inner end of each of the aligned flow passages. A ring shaped seat member is disposed in each recess around the inner end of the flow passages and a secondary seal member is slidably disposed around at least one of the ring shaped seal members. The secondary seal member comprises a ring shaped support element including portions extending along opposite sides of the gate. A seal means is supported by the ring shaped support element facing the gate. The gate valve further includes cooperating cam means associated with the gate and with the ring shaped support element for moving the ring-shaped support element toward the gate when the gate is moved toward the closed position to form a secondary seal between the secondary seal member and the gate, and for deenergizing the secondary seal prior to substantial movement of the gate toward an open position.

In a preferred embodiment of the present invention, the cooperating cam means includes a camming edge disposed along opposite sides of the gate. A pin follower is carried by each extended portion and adapted to engage with and follow the camming edge. An energizing ring is disposed between the ring-shaped support element and the seal means. A compressible elastomeric seal ring is disposed between the energizing ring and the seal means such that movement of the ring-shaped support element forces the energizing ring against the compressible elastomeric seal ring to form the secondary seal upon closing and such that the slight movement of the ring-shaped support element away from the gate allows the energizing ring to be forced outwardly by the compressible, elastomeric seal ring to deenergize the seal between the seal means and the gate.

In a still more preferred embodiment of the present invention, the valve further comprises a spring member having a selected spring constant positioned between the energizing ring and the ring-shaped support element such that the spring member is adapted to provide pressure relief for the seal means when a selected pressure level is reached.

In a yet more preferred embodiment of the present invention, the elastomeric seal ring is an O-ring comprised of elastomeric material. Additionally, the spring member may be comprised of a belleville spring of a selected spring constant.

In an alternative embodiment of the present invention, the cooperating cam means includes a camming wedge slidably mounted along opposite sides of the gate such that movement of the wedge is effected prior to movement of the gate upon opening of the gate. The wedge includes a camming edge surface. The extended portion of the ring-shaped support element includes a pin follower carried thereon and adapted to engage with the camming edge surface of the camming wedge. Hence, the camming wedge provides for lost motion during the opening of the valve during which the wedge releases and deenergizes the secondary seal prior to movement of the gate to open the valve.

In a preferred aspect of the alternative embodiment of the present invention, the gate valve further includes a spring member having a selected spring constant wherein the spring member is positioned between the ring-shaped support element and the seal means in order to provide pressure relief for the seal means.

In yet another alternative embodiment of the present invention, the present invention includes a gate valve comprising a valve body having a valve chamber therein and a pair of flow passages aligned at opposite sides of the valve chamber. A recess is disposed around the inner end of each of the aligned flow passages in the valve body. A gate member having an imperforate section and a section having a flow passage therethrough is disposed within the valve chamber and is reciprocably movable along a line substantially transverse to the valve chamber flow passages between a gate position in which the valve is open and the flow passage of the gate member aligns with the valve chamber flow passages, and a gate position in which the valve is closed and the imperforate section aligns with the valve chamber flow passages. A valve seat is disposed in each of the recesses around the inner end of the flow passages. At least one of the valve seats comprises a ring-shaped seat against which the gate member slides between the open and closed positions such that the gate forms a primary seal with the ring-shaped seat when the gate is in the valve closed position. A seal support ring is slidably disposed around the ring shaped valve seat. The seal support ring has an inner recess therearound at the end adjacent the gate. An elastomeric seal member is disposed in the inner recess of the seal support ring and a spring member having a selected spring constant is positioned between the seal support ring and the elastomeric seal member such that the spring member provides pressure relief for the elastomeric seal member. The gate valve further includes a means associated with the seal support ring and the gate for drawing the seal support ring toward the gate when the gate is moved from the valve open position toward the valve closed position to force the elastomeric seal into sealing engagement with the gate after the gate has reached the closed position to form a secondary seal after formation of the primary seal.

In a preferred aspect of this embodiment, the spring member is a belleville spring having a selected spring constant.

Accordingly, the present invention provides a means for quickly deenergizing the secondary seal through either a compressible elastomeric seal ring disposed between the secondary seal member and the ring-shaped seal support member wherein the decompression or elastic return of the seal ring "deenergizes" or relieves the secondary seal, or through means of a floating wedge adapted for movement prior to movement of the gate across the secondary seal. The present invention also provides a spring pressure relief means for preventing damage to the seal from pressurized fluid on the upstream side once a selected pressure level is reached on the seal.

BRIEF DESCRIPTION OF THE DRAWINGS

These and other advantages of the present invention will further be illustrated by reference to the appended drawings which illustrate particular embodiments of a gate valve constructed in accordance with the present invention.

DETAILED DESCRIPTION OF THE PREFERRED EMBODIMENTS

Specific embodiments of a gate valve are illustrated which will accommodate the use of a secondary seal assembly. The gate valves illustrated are of a rising stem style similar to that shown in U.S. Pat. No. 4,377,273, which is incorporated herein by reference. It will become apparent to those skilled in the art in view of the above and below disclosure that the present invention could be similarly utilized with solid gate valves, split gate valves, balanced stem valves, or non-rising stem valves.

Figure 1:
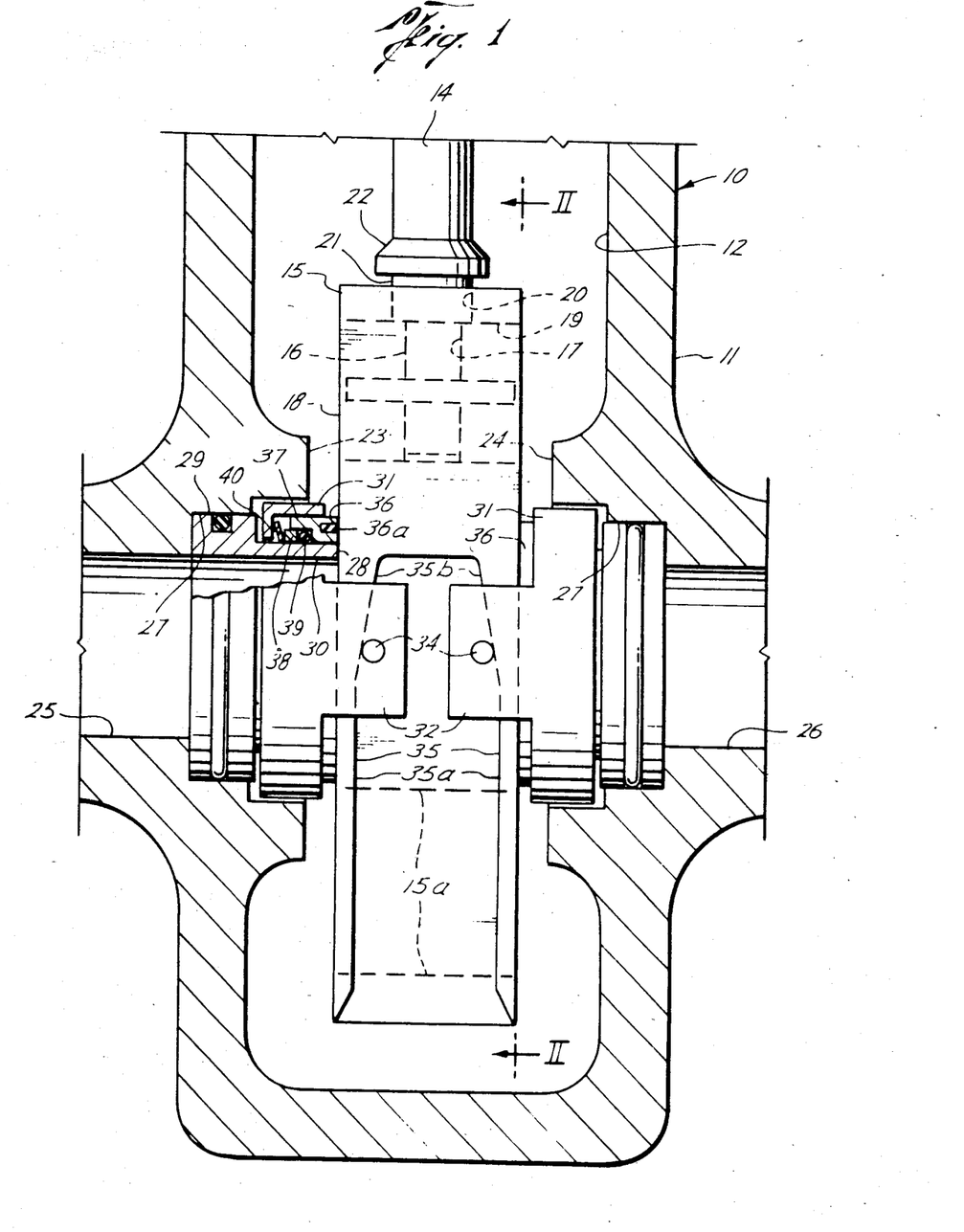
FIG. 1 is a vertical axial cross section illustrating a preferred embodiment of a gate valve constructed in accordance with the present invention.

Referring to FIG. 1, the gate valve 10 includes a valve body 11 which is hollow, having a valve chamber 12 therewithin. The upper or bonnet portion of the valve (not shown) may comprise a bonnet of any conventional form which provides a closure of the upper end of the chamber 12 and forms a seal between the valve body 11 and the stem 14.

The valve 10 includes a gate element 15 disposed within the chamber 12. The gate 15 has generally rectangular surfaces and is interconnected at the top with a stem 14. The stem 14 is adapted to raise and lower the gate 15 upon the selective movement of the stem 14.

Referring still to FIG. 1, the lower end of the stem 14 may take the form of a threaded stud 16 which is screwed and pinned into a tapped diametric opening 17 of a cylinder 18 which is received within a cylindrical opening 19 of the gate 15. The threaded stud 16 is connected to a cylindrical portion 21 of the stem 14 which is in turn received into an opening 20 of the gate 15. An upward conical formation 22 is formed around the stem 14 above the cylindrical portion 21 to provide a stop to prevent excessive upward movement of the stem by contact of formation 22 with the underside of the bonnet (not shown).

Vertical movement of the stem may be provided in a variety of manners. In the embodiment illustrated, the stem 14 may typically have threaded engagement with a yoke nut (not shown), so that rotation of the nut causes longitudinal movements of the stem 14 and the gate 15 in either direction.

It will be appreciated by those of skill in the art that these and other suitable means for attaching the stem 14 to the gate 15 may be utilized in accordance with the present invention.

Referring again to FIG. 1, two opposite formations 23, 24 project into the chamber 12 of the valve 10 around the inner ends of the opposed aligned flow passages 25, 26 of the valve body 11. The gate 15 has a flowport 15a therethrough which is positioned such that when the gate is moved upwardly to be opened, the flow port 15a aligns with passages 25 and 26.

Figure 2:
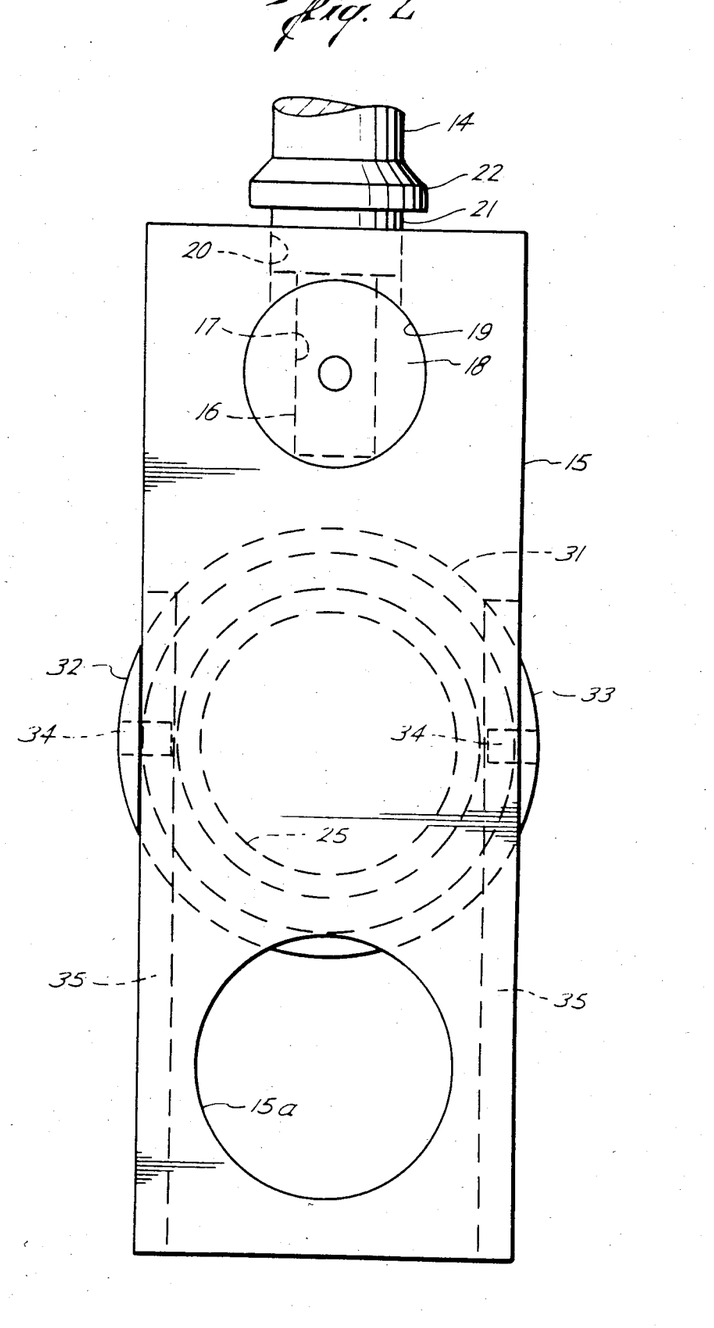
FIG. 2 is a vertical cross section taken at line II—II of FIG. 1.

A stepped annular recess 27 is formed around each of the flow passages 25, 26 concentrically into formations 23, 24. A valve seat member 28 having an outwardly enlarged portion 29 is mounted in the bottom part of recess 27 and includes a tubular portion 30 of outwardly reduced diameter. The tubular portion 30 is adapted to engage the gate 15 at its end as shown in FIG. 1. A seal support ring 31, forming the main body portion of the supplemental or secondary seal, is disposed around the extended tubular portion 30 of the seat 28 within the enlarged portion of the stepped recess 27. The seal support ring 31 is generally ring-shaped and has an inwardly relieved recess at its end toward the gate 15 such that the seal support ring 31 has an L-shaped configuration in cross section. The seal support ring 31 further includes a pair of extending portions 32 and 33 which extend along the opposite sides of the gate 15 as best shown in FIG. 2. Each extending portion 32 and 33 has fixed to a flat inwardly facing surface along the gate 15 a short cylindrical pin 34. The gate 15 further includes a camming edge 35 disposed along each of its sides. Each camming edge 35 has a vertical portion 35a at its lower end, above which is provided a slanted portion 35b. The pins 34 are engaged with the camming edge 35 in a cam and follower manner. When the gate 15 is moved downwardly toward a closed position by downward movement of the stem 14, the pins 34 move along the edge 35 from a position along 35a (not shown) toward a position along 35b to move the ring support element 31 toward the gate as shown in FIG. 1.

Figure 3:
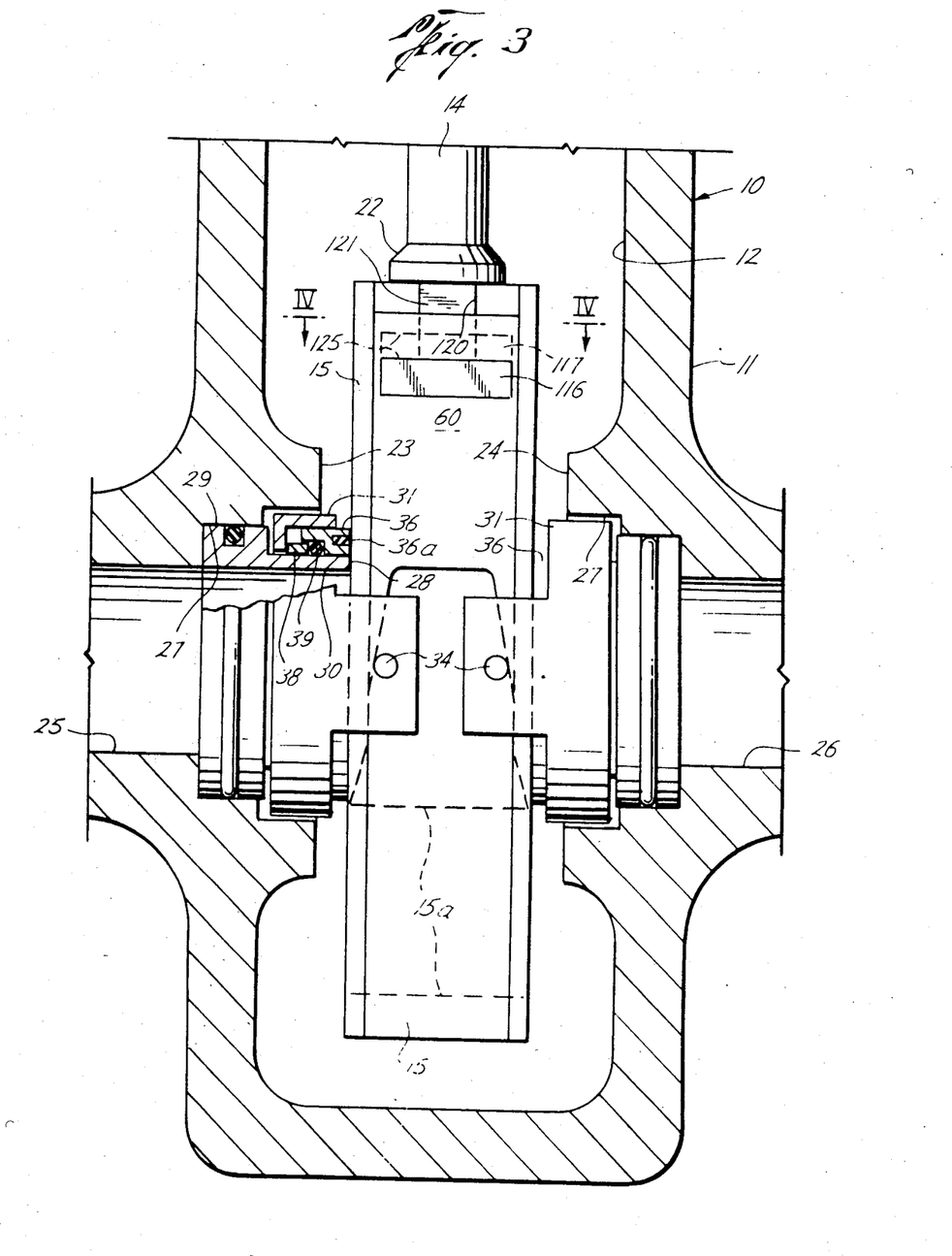
FIG. 3 is a vertical axial cross section illustrating an alternative embodiment of the gate valve incorporating the camming wedge in accordance with the present invention.

In U.S. Pat. No. 4,377,273, camming edges were provided by grooves 45 having front and back edges for closing and opening the secondary seal. As particularly shown in FIG. 1 and in U.S. Pat. No. 4,377,273, incorporated herein by reference as set out above, the secondary seal should be initially made up mechanically to cause the secondary seal 36a to sealingly engage the face of gate 15, presuming flow is from flow passage 26 to flow passage 25. Thereafter, if there is any leakage around the metal-to-metal seal, the force from the pressure of the fluid in the body of the valve acting on seal means 36 to force the seal 36a into engagement with the gate face will be significantly greater than the force from the pressure of one fluid in the body of the valve acting on seal means 36 to force the seal 36a out of engagement with the gate face. Both of these forces will usually be significantly greater than the mechanical force of the spring member 40. It has been found, however, that the fluid pressure within the valve acts to open the secondary seal, and that the back edge of the groove 45 shown in U.S. Pat. No. 4,377,273 may be eliminated, as shown in FIGS. 1 and 3 of the present disclosure.

Referring still to FIG. 1, a secondary seal member further includes seal means 36 supported by the ring-shaped support element 31 such that movement of the seal support ring 31 forces the seal means 36 to engage the gate 15 to form a secondary seal. The seal means 36 is comprised of a stepped annular ring having an inner recess 37 such that the seal means 36 is somewhat L-shaped in cross section. The seal means 36 may further include an annular resilient seal element 36a mounted to the seal means 36 by press fitting or other suitable means.

The valve 10 further includes a means for deenergizing the secondary seal prior to substantial linear movement of the gate 15 across the fully energized seal means 36. In the embodiment illustrated in FIG. 1, the means for quickly deenergizing the secondary seal includes an energizing ring 38 slidably disposed within the inner recess 37 and a compressible, elastomeric seal ring 39 disposed between the energizing ring 38 and the seal means 36. The seal ring 39 may be comprised of any material having suitable compressible, elastomeric properties such that upon movement of the energizing ring 38 to compress the seal ring 39 when the secondary seal is effected, the seal ring 39 compresses and spreads outwardly to form a fluid tight, essentially incompressible seal. In the preferred embodiment, the seal ring 39 is comprised of a compressible, elastomeric O-ring having a substantially circular cross section.

The preferred embodiment may further include a means for providing pressure relief for the seal means 36. In the illustrated embodiment of FIG. 1, the pressure relief means includes a spring member 40 disposed between the base of the seal support ring 31 and the energizing ring 38. The spring member 40 has a selected spring constant of a value selected such that once a seal between the seal means 36 and the gate 15 is effected, the spring member 40 will compress when a given force is exerted on the seal means 36 (and more specifically against seal ring 39 in FIG. 1) by pressurized fluid from the upstream side (or from the passageway 25 shown in FIG. 1). The compression of the spring 40, in turn, allows the seal means 36 to move away from the gate 15 on the upstream side in order to prevent destruction of the resilient seal element 36a.

It will be understood that the selection of a particular spring constant is dependent upon the materials comprising seal means 36, seal ring 39, and seal element 36a, and their ability to withstand a certain threshold pressure. Such selection is a matter of design which will be known to those of skill in the art in view of the present disclosure.

The spring member 40 may be comprised of a number of suitable springs providing the desired spring constant for a particular design of sealing means. In the preferred embodiment, the spring member 40 is comprised of a belleville spring having a suitable spring constant selected to yield at a desired level of pressure.

Accordingly, the embodiment of the present invention illustrated in FIGS. 1 and 2 provides both a means for upstream pressure relief and a means for quickly deenergizing the seal 36.

The gate valve of the present invention may alternatively include a cooperating cam means which comprises a camming wedge slidably mounted along opposite sides of the gate such that movement of the wedge is effected prior to the movement of the gate upon the opening of the gate, whereby the secondary seal is deenergized prior to movement of the gate across the seal. Referring to FIGS. 3-6, in which like members to FIGS. 1 and 2 are given like reference numerals, the preferred embodiment of a gate valve incorporating such a camming wedge is shown. In the description of the embodiment shown in FIGS. 3-6, the terms "vertical" and "horizontal" are used in reference to a valve having the orientation shown in FIG. 3, wherein a valve is shown in the upright position with the stem extending upwardly out the top of the valve.

Figure 5:
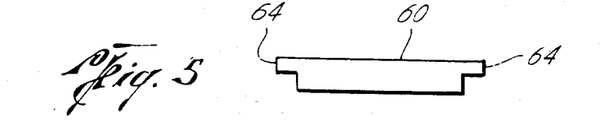
FIG. 5 is a plan view of a camming wedge constructed in accordance with the present invention.
Figure 6:
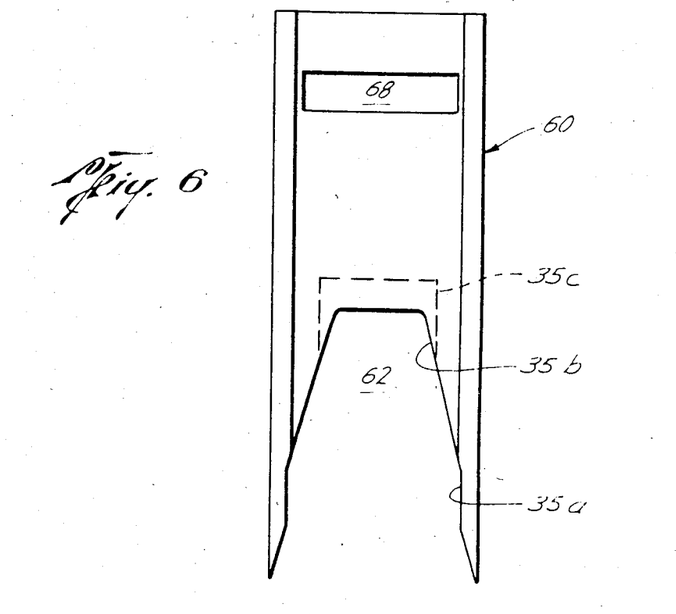
FIG. 6 is a side view of the camming wedge shown in FIG. 5.

Referring first to FIGS. 5 and 6, the camming wedge 60 has a generally rectangular configuration having a lower recess 62 extending therein. The recess 62 includes camming edges 35 which are essentially identical in function and similar in configuration to the camming edges 35 shown in FIG. 1. In particular, the camming edge 35 has a vertical portion 35a at its lower end and an upper slanted portion 35b. As described for FIG. 1, the camming edge 35 engages in use with the pins 34 in a cam and follower manner such that when the gate 15 is moved downwardly to a closed position by the downward movement of the stem 14, the pins 34 move along the edge 35 from a position along 35a toward a position along 35b to move the ring support element 31 toward the gate 15 to form the secondary seal.

Figure 4:
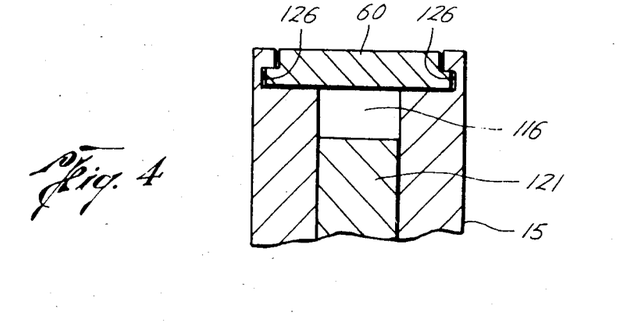
FIG. 4 is a horizontal cross section of the gate assembly taken at line IV—IV of FIG. 3.

The wedge 60 also includes a pair of opposing tabs 64 extending outwardly from either side to engage within mating channels 126 in the gate 15 such that the gate 15 slidably supports the wedge 60 for longitudinal movement as shown in FIGS. 3 and 4. The wedge 60 additionally comprises a horizontal slot 68 having a generally rectangular configuration in cross-section. As will be explained in greater detail below, the horizontal slot 68 is configured to fit onto the lower portion of the stem 14 such that play between the wedge 60 and the stem 14 in the vertical direction is minimized.

Referring to FIG. 3, the lower portion of the stem 14 includes a longitudinal section 121 having a rectangular configuration in horizontal cross-section. A transverse member 116, also having rectangular sides and bottom, is secured to the longitudinal section 121 such that the two members are configured in the form of an inverted block T. As shown in FIG. 3, in the preferred embodiment, the horizontal width of the transverse member 116 is greater than the horizontal width of the longitudinal member 121, but less than the corresponding width of the gate 15. Further, the horizontal length of the transverse section 116 is greater than the horizontal length of the longitudinal member 121, but substantially equal to the corresponding horizontal length of the gate 15. As shown in FIG. 3, the transverse section 116 is configured at each end to be slidably received within the horizontal slot 68 of the wedge 60 such that freedom of play between the wedge 60 and the horizontal slot 68 in the vertical direction is minimized.

The gate 15 includes a longitudinal slot 120 adapted to slidably receive the longitudinal section 121 and a transverse slot 117 adapted to slidably receive the transverse section 116. The longitudinal slot 120 is configured such that it slidably receives the longitudinal section 121 and provides limited freedom of latitudinal movement of the gate 15 in relation to the stem 14. The transverse slot 117 has a greater vertical dimension than the transverse section 116 such that a selected length 125 of vertical movement of the stem 14 is provided without corresponding movement of the gate 15.

For purposes of assembly, it should be understood that in the illustrated embodiment, the horizontal cross-sectional width of the longitudinal section 121 is not critical so long as a width is selected to provide suitable strength for the load expectations on the stem 14. Similarly, the horizontal cross-sectional length of the section 121 is not critical, but must be sufficiently less than the horizontal cross-sectional length of the gate 15 to accommodate the sliding of the stem 114 to one side of the gate 15 to accommodate installation of the wedges 60. This clearance is best illustrated in FIG. 4. It will be appreciated that other configurations of the stem 14, wedge 60, and gate 15 may be utilized to accommodate assembly of the three members in accordance with the present invention.

Accordingly, when the valve 10 is in a closed position, as shown in FIG. 3, the secondary seal has been effected by the downward movement of the camming wedge 60. When it is desired to open the valve, the upward movement of the stem 14 for the selected distance 125 will raise the camming wedge 60 without a corresponding movement of the gate 15. This "lost motion" allows the camming wedge 60 to substantially release the secondary seal before any upward movement of the gate 15 is provided.

In this regard, it should be noticed that upon the movement of the gate 15 downwardly to close the valve, the drag of the primary seal upon the gate 15 will cause the gate 15 to seek the highest position as shown in FIG. 3. Alternatively, lower stops could be provided for the gate 15 whereby the gate "bottoms out" against such a stop to insure that the freedom for lost motion is provided upon the upward movement of the stem 14.

Referring again to FIG. 6, an alternative design for the camming edges 35 shown in FIGS. 1 and 3 is disclosed which provides a means for limiting the force with which the secondary seal is effected. In particular, the camming edges 35 may be configured to include an upper vertical portion 35c (shown ghosted). The vertical portion 35c is disposed substantially parallel to the side of the gate 15 in use such that the engagement of the follower pin 34 with the edge 35c will cease movement of the ring shaped support element 31 toward the gate 15 and will thereby cease further tightening of the secondary seal.

Figure 7:
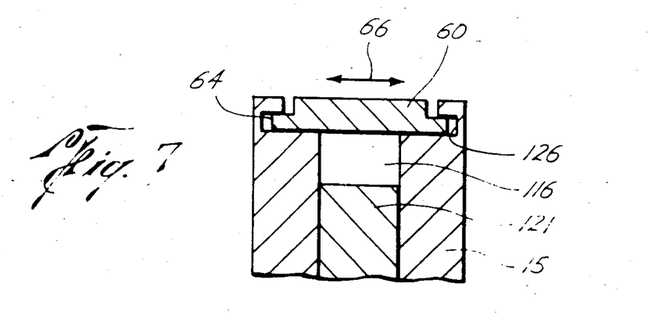
FIG. 7 is a horizontal cross section of the gate assembly taken along line IV—IV of FIG. 3, illustrating an alternative embodiment of the camming wedge adapted for evenly applying secondary seals.

Referring now to FIG. 7, there is shown an alternative embodiment of the camming wedge 60 of FIGS. 5-6 adapted to center the gate 15 between opposing secondary seals such that the secondary seals are evenly applied. As shown in FIG. 7, the wedge 60 may have the same basic configuration in horizontal cross-section as the wedge 60 shown in FIG. 4. In the embodiment shown in FIG. 7, however, the wedge 60 is of a dimension such that when the wedge 60 is mounted onto the gate 15, clearance is provided between the tabs 64 and the bottom of the mating channels 126 and between the wedge 60 and the gate 15 in order to allow latitudinal movement of the wedge 60 in relation to the gate 15 as shown by the arrow 66.

Accordingly, when wedges having clearance for such latitudinal movement are mounted to the gate 15 as shown in FIG. 7, the wedges float to compensate for misalignment of the gate between opposing secondary seals and insure that the seals are evenly applied to the opposing sides of the gate 15.

The instant invention has been disclosed in connection with specific embodiments. However it will be apparent to those skilled in the art that variations from the illustrated embodiments may be undertaken without departing from the spirit and scope of the invention. For example, the camming wedge 60 of FIG. 7 could further be incorporated into the embodiment shown in FIG. 1, without the provision for lost motion between the gate and the stem upon the opening of the valve. Additionally, the pressure release means or spring member could be incorporated into the embodiment shown in FIG. 3 to insure that the seal means 36 would yield when a selected pressure level was reached upstream. These and other variations will be obvious to those skilled in the art and are within the spirit and scope of the invention.

What is claimed is:

1. A gate valve, comprising:
   (a) a valve body having a valve chamber therein and a pair of flow passages aligned at opposite sides of the valve chamber, and additionally having a recess around the inner end of each of the aligned flow passages;
   (b) a gate member having an imperforate section and a section having a flow passage therethrough, the gate member being disposed within the valve chamber and being reciprocably movable along a line substantially transverse to the valve chamber flow passages between a gate position in which the valve is open and the flow passage of the gate member aligns with the valve chamber flow passages and a gate position in which the valve is closed and the imperforate section aligns with the valve chamber flow passages;
   (c) a valve seat in each of the recesses around the inner end of the flow passages, at least one of the valve seats comprising a ring-shaped seat against which the gate member slides between the open and closed positions such that the gate forms a primary seal with the ring shaped seat when the gate is in the valve closed position;
   (d) a seal support ring slidably disposed around said ring-shaped seat, the seal support ring having an inner recess therearound at the end adjacent the gate;
   (e) an elastomeric seal member disposed in the inner recess of the seal support ring; and
   (f) means associated with said seal support ring and said gate for drawing the seal support ring toward the gate when the gate is moved from the valve open position toward the valve closed position to force the elastomeric seal member into sealing engagement with the gate after the gate has reached the closed position to form a secondary seal after the formation of the primary seal, and for moving the seal support ring such that the secondary seal is deenergized prior to substantial movement of the gate across the elastomeric seal member whereby drag and wear of the elastomeric seal member by the gate are minimized upon the movement of the gate to the open position.

2. The combination of claim 1, wherein said means includes:
   (a) a camming edge disposed along opposite sides of the gate member;
   (b) pin follower means carried by the seal support ring and adapted to engage with said camming edges;
   (c) an energizing ring disposed between the seal support ring and the elastomeric seal member; and
   (d) an elastomeric seal ring disposed between the energizing ring and the elastomeric seal member.

3. The combination of claim 2 further comprising a spring member having a selected spring constant positioned between the energizing ring and the seal support ring in which the spring member provides pressure relief for the elastomeric seal member.

4. The combination of claim 2 in which the elastomeric seal ring is an O-ring comprised of elastomeric material.

5. The combination of claim 3 in which the elastomeric seal ring is an O-ring comprised of elastomeric material.

6. The combination of claim 3 in which the spring member is a belleville spring.

7. The combination of claim 1 wherein said means includes:
   (a) a camming wedge slidably mounted along opposite sides of the gate such that movement of the wedge is effected prior to movement of the gate upon opening of the gate, the wedge including a camming edge surface; and
   (b) pin follower means carried by the seal support ring and adapted to engage with the camming edge surface of the camming wedge.

8. A gate valve, comprising:
   (a) a valve body having a valve chamber therein and a pair of flow passages aligned at opposite sides of the valve chamber, and additionally having a recess around the inner end of each of the aligned flow passages;
   (b) a gate member having an imperforate section and a section having a flow passage therethrough, the gate member being disposed within the valve chamber and being reciprocably movable along a line substantially transverse to the valve chamber flow passages, between a gate position in which the valve is open and the flow passage of the gate member aligns with the valve chamber flow passages and a gate position in which the valve is closed and the imperforate section aligns with the valve chamber flow passages;
   (c) a valve seat in each of the recesses around the inner end of the flow passages, at least one of the valve seats comprising a ring shaped seat against which the gate member slides between the open and closed position such that the gate forms a primary seal with the ring shaped seat when the gate is in the valve closed position;
   (d) a seal support ring slidably disposed around said ring shaped seat, the seal support ring having an inner recess therearound at the end adjacent the gate;
   (e) an elastomeric seal member disposed in the inner recess of the seal support ring;
   (f) a spring member having a selected spring constant positioned between the seal support ring and the elastomeric seal member in which the spring member provides pressure relief for the elastomeric seal member; and
   (g) means associated with said seal support ring and said gate for drawing the seal support ring toward the gate when the gate is moved from the valve open position toward the valve closed position to force the elastomeric seal member into sealing engagement with the gate after the gate has reached the closed position to form a secondary seal after the formation of the primary seal.

9. The combination of claim 8 in which said spring member is a belleville spring.

10. A gate valve, comprising:
   (a) a valve body having a valve chamber therein and a pair of flow passages aligned at opposite sides of the valve chamber, and additionally having a recess around the inner end of each of the aligned flow passages;
   (b) a gate member having an imperforate section and a section having a flow passage therethrough, the gate member being disposed within the valve chamber and being reciprocably movable along a line substantially transverse to the valve chamber flow passages, between a gate position in which the valve is open and the flow passage of the gate member aligns with the valve chamber flow passages and a gate position in which the valve is closed and the imperforate section aligns with the valve chamber flow passages;
   (c) a valve seat in each of the recesses around the inner end of the flow passages, the valve seats each comprising a ring shaped seat against which the gate member slides between the open and closed position such that the gate forms a primary seal with the ring shaped seat when the gate is in the valve closed position;
   (d) a seal support ring slidably disposed around each said ring shaped seat, the seal support ring having an inner recess therearound at the end adjacent the gate;
   (e) an elastomeric seal member disposed in the inner recess of each seal support ring; and
   (f) means associated with said seal support ring and said gate for evenly drawing said seal support rings toward the gate when the gate is moved from the valve open position toward the valve closed position to substantially evenly force the elastomeric seal member into sealing engagement with the gate after the gate has reached the closed position to form opposing secondary seals after the formation of the primary seal.

11. The combination of claim 10 wherein the means includes:
   (a) a camming wedge including opposing camming edge surfaces, the camming wedge being slidably mounted along opposite sides of the gate for movement parallel to the gate and transverse to said valve chamber flow passages, the camming wedge further being secured to the gate such that limited freedom of movement of the wedge in relation to the gate and parallel to the flow passages is provided; and
   (b) pin follower means carried by each seal support ring and adapted to engage with the camming edge surfaces of the camming wedges.

12. The valve of claim 1 wherein said means includes:
   (a) a camming wedge slidably mounted along opposite sides of the gate, the wedge including a camming edge surface; and
   (b) a pin follower carried by the extended portion and adapted to engage with the camming edge surface of the camming wedge.

13. The valve of claim 12, wherein the camming wedge surface includes a substantially vertical surface positioned to cause the pin follower to rise substantially vertically to maintain the position of the ring-shaped seal member, whereby the mechanical force on the spring is prevented from additional increase.

14. The valve of claim 12, wherein the means includes limiting means for limiting the movement by the means of the seal support ring toward the gate.

15. The valve of claim 10 wherein the means includes limiting means for limiting the movement by the means of the seal member in engagement with the face of the gate.

* * * * *